United States Patent [19]
Yasuda et al.

[11] Patent Number: 6,123,184
[45] Date of Patent: Sep. 26, 2000

[54] PARTS ALIGNMENT DEVICE

[75] Inventors: Mikio Yasuda; Isamu Chimoto, both of Aichi; Takeshi Nishiguchi, Kyoto, all of Japan

[73] Assignee: Matsushita Electric Industrial Co., Ltd., Osaka, Japan

[21] Appl. No.: 09/130,002

[22] Filed: Aug. 6, 1998

[30] Foreign Application Priority Data

Aug. 7, 1997 [JP] Japan .................................. 9-212812

[51] Int. Cl.[7] .................................................. B65G 47/24
[52] U.S. Cl. ........................................ 198/381; 198/690.1
[58] Field of Search ..................................... 198/381, 396, 198/690.1, 443, 619; 221/165, 160

[56] References Cited

U.S. PATENT DOCUMENTS 3,754,313  8/1973  McCulloch ................................ 29/203

FOREIGN PATENT DOCUMENTS

2833424A1  7/1978  Germany .
5-77133    4/1992  Japan ............................... B65G 65/44
1141571    1/1969  United Kingdom ........... B65G 29/02

Primary Examiner—Christopher P. Ellis
Assistant Examiner—Rashmi Sharma
Attorney, Agent, or Firm—Pearne & Gordon LLP

[57] ABSTRACT

A parts alignment device includes: an input port introducing chip-like parts having a magnetic-substance electrode; a storage chamber storing the parts introduced through the input port; a wall made of non-magnetic material, the wall defining a back surface of the storage chamber; an arc-like guide made of non-magnetic material and provided at least above the storage chamber; an intake port provided in connection with the guide and taking in only parts aligned in a predetermined direction from the parts; a parts passageway connected to the intake port and provided toward downstream of the intake port; a rotary plate made of non-magnetic material and provided at the rear of the wall so as to rotate in a parts taking-in direction of the intake port; and a magnet provided on the rotary plate. The magnet attracts the parts both in a direction of the guide and in a direction of the wall simultaneously by a magnetic force thereof.

35 Claims, 13 Drawing Sheets

PARTS ALIGNMENT DEVICE

BACKGROUND OF THE INVENTION

1. Field of the Invention

The present invention relates to a parts alignment device for aligning chip-like parts.

2. Description of the Related Art

Description will be given below about a conventional parts alignment device. The conventional parts alignment device is constituted by a square-pole-like parts storage chamber 1, a rotary plate 3 provided closely to a wall 2 of the storage chamber 1, a magnet 4 buried near the circumference of the rotary plate 3, a parts acceptance portion 6 provided in a position corresponding to this magnet 4 from a side wall 5 adjacent to the wall 2 toward the downstream, and a parts passageway 7 connected to the outlet of the acceptance portion 6 and provided toward the downstream, as shown in FIG. 15.

Description will be given about the operation of the parts alignment device configured thus. The reference numeral 8 represents chip-like parts having a magnetic-substance electrode and stored in the storage chamber 1. With rotation of the rotary plate 3 in the direction A, these parts 8 are attracted and carried upward by the magnet 4. Colliding with the wall 5, the parts 8 are separated from the magnet 4 and accepted by the acceptance portion 6. This acceptance portion 6 accepts only parts 8 aligned in a predetermined direction. Here, the parts 8 which are not accepted by the acceptance portion 6 fall down to the lower portion of the storage chamber 1, and wait to be attracted by the magnet 4 again. On the other hand, the parts 8 which are accepted by the acceptance portion 6 are already aligned, and fed out to the passageway 7 as they are in the state where the parts 8 are aligned.

As a technique similar to this, for example, there is that which is disclosed in Japanese Model-Utility Unexamined Publication No. Hei-5-77133.

However, in such a conventional configuration, the parts 8 attracted by the magnet 4 face various directions. In this state, the parts 8 collide with the wall 5 and are accepted by the acceptance portion 6, so that the parts 8 still look in various directions. It is considered that most of the parts 8 fall down to the lower portion of the storage chamber 1. It is therefore supposed that the number of the parts 8 aligned in the acceptance portion 6 is considerably small. As is understood in this example, the conventional technique has a problem that the speed to align the parts 8 is slow.

SUMMARY OF THE INVENTION

The present invention is to solve such a problem, and it is an object thereof to provide a parts alignment device in which the speed to align parts is fast.

To solve the above object, there is provided a parts alignment device including: an input port introducing chip-like parts having a magnetic-substance electrode; a storage chamber storing the parts introduced through the input port; a wall made of non-magnetic material, the wall defining a back surface of the storage chamber; an arc-like guide made of non-magnetic material and provided at least above the storage chamber; an intake port provided in connection with the guide and taking in only parts aligned in a predetermined direction from the parts; a parts passageway connected to the intake port and provided toward downstream of the intake port; a rotary plate made of non-magnetic material and provided at the rear of the wall so as to rotate in a parts taking-in direction of the intake port; and a magnet provided on the rotary plate. The magnet attracts the parts both in a direction of the guide and in a direction of the wall simultaneously by a magnetic force thereof.

According to the above structure, the speed to align the parts becomes fast.

BRIEF DESCRIPTION OF THE DRAWINGS

Similar reference characters denote corresponding features consistently throughout the attached drawings. The preferred embodiments of this invention will be described in detail, with reference to the following figures, wherein.

DETAILED DESCRIPTION OF THE PREFERRED EMBODIMENTS

Modes for carrying out the present invention will be described below on the basis of the drawings.

(First Embodiment)

Figure 1:
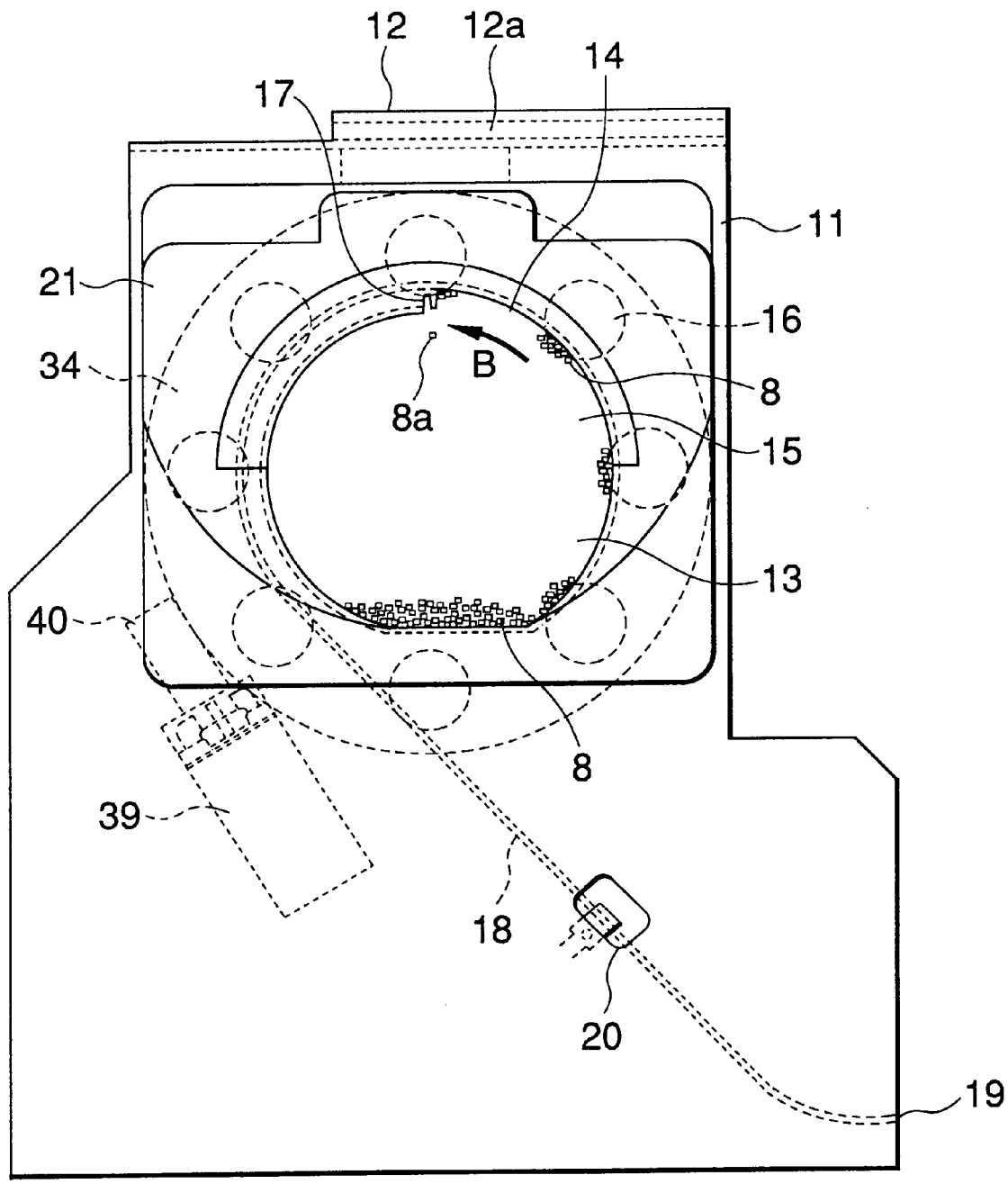
FIG. 1 is a front view of a parts alignment device according to a first embodiment of the invention.

In FIG. 1, the reference numeral 11 represents a body case; 12, an input port for parts 8 (like a chip and with a magnetic-substance electrode), which is provided in the upper portion of the body case 11; 13, a storage chamber for the parts 8. A circular guide 14 is provided in the outer circumference of the storage chamber 13. At the rear of a wall 15 of the storage chamber 13, a plurality of magnets 16 rotate in the direction B, so that the parts 8 are attracted by the magnets 16 and lifted up along the guide 14. The reference numeral 17 represents an intake port for taking-in the parts 8. Only the parts 8 aligned in a predetermined direction are taken-in from this intake port 17. The taken-in parts 8 flow into a passageway 18 smoothly connected to the intake port 17 in the state where the parts 8 are aligned, and the parts 8 further flow to a lower outlet 19.

According to such a configuration, when a rotary plate 34 provided with the magnets 16 rotates in the direction B, a plurality of parts 8 are attracted to the surface of the guide 14 and to the surface of the wall 15, and rotated together with the rotary plate 34. When the parts 8 come to the intake port 17 in this state, parts 8 aligned in a predetermined direction relative to this intake port 17 are taken into the intake port 17 so as to flow toward the downstream in the passageway 18. On the other hand, parts 8a not-aligned at the intake port 17 cannot flow into the intake port 17, so that the parts 8 fall down, are attracted to the surface of the guide 14 and to the surface of the wall 15, and rotate together with the rotary plate 34 again. In such a manner, the parts 8 are attracted to the surface of the guide 14 and to the surface of the wall 15 simultaneously before they flow into the intake port 17. Accordingly, most of the parts 8 are enforcedly aligned by this attraction, so that parts alignment can be performed at a high speed. In this embodiment, about 1,000 parts can be aligned in a minute.

The reference numeral 20 represents a detection sensor provided in the downstream side half of the whole length of the passageway 18. The detection sensor 20 is formed of a non-contact transmission-type photosensor. When this sensor 20 detects the fullness of the parts 8 to a position of the sensor 20, the magnets 16 are controlled to stop its rotation. Consequently, not only the parts 8 are prevented from being rubbed in vain in the storage chamber 13, but also saving the rotation energy of the rotary plate 34 is expected.

Although a transmission-type photosensor is used as the detection sensor 20 in this embodiment, either a reflection-type photosensor or a magnetic sensor may be used. Here, it is important that a non-contact detection sensor is used on the point that the parts 8 are not damaged or the detection speed is high.

Figure 2:
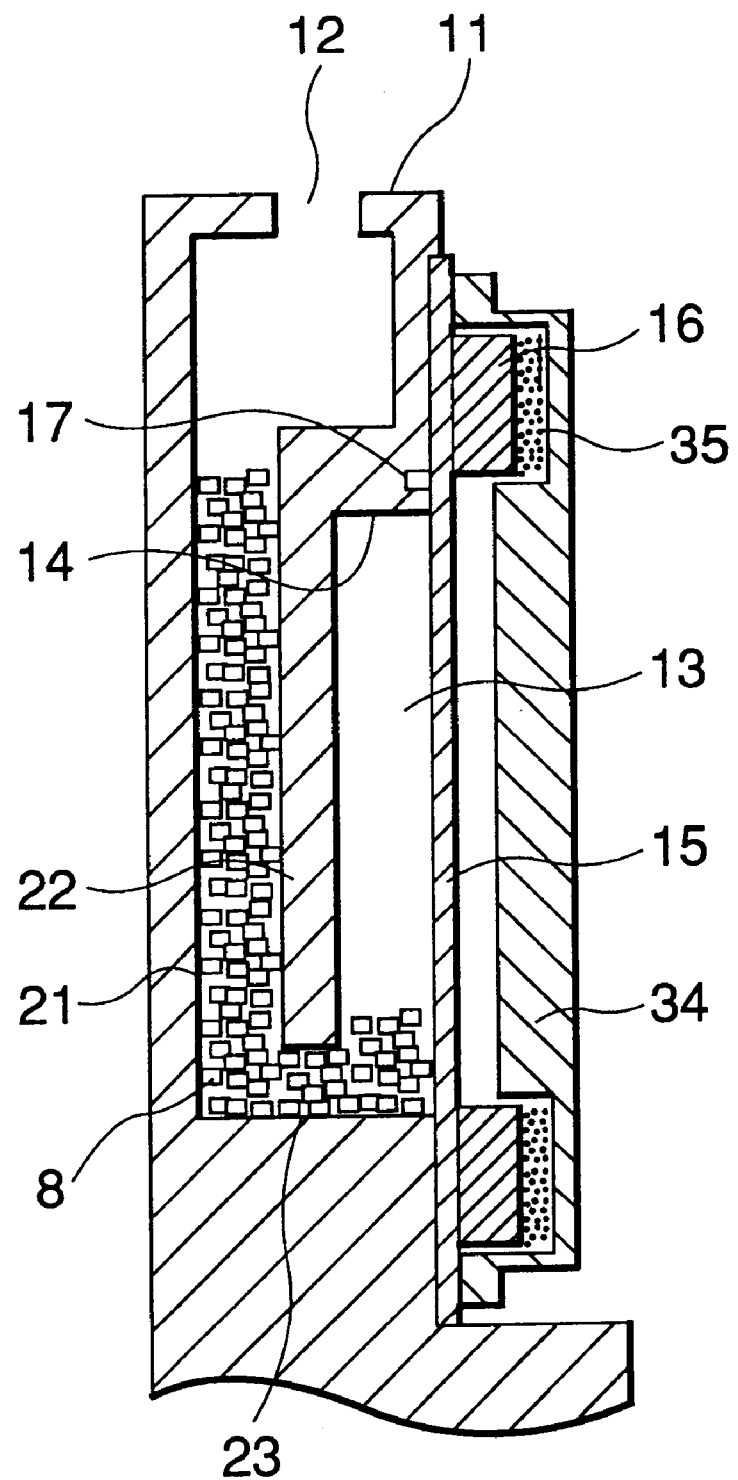
FIG. 2 is a main part sectional view of the first embodiment.

FIG. 2 is a sectional view of a main part of a parts alignment device. In FIG. 2, parts 8 introduced through an input port 12 provided in the upper portion of a body case 11 is once stored in an auxiliary storage chamber 21. This auxiliary storage chamber 21 is separated from a storage chamber 13 by a wall 22 provided so as to continue to a guide 14. However, the auxiliary storage chamber 21 is connected to the storage chamber 13 at a lower portion 23 of this wall 22. It is therefore possible to feed the parts 8 from the auxiliary storage chamber 21 to the storage chamber 13 little by little. This is an important point because the number of the parts 8 always stored in the storage chamber 13 can be made small. Therefore, the number of the parts 8 moving in the storage chamber 13 by a magnet 16 is small. That is, the number of the parts 8 subjected to unnecessary friction is small. However, a suitable quantity of the parts 8 are always supplied from the auxiliary storage chamber 21 to the storage chamber 13. Accordingly, there is no fear that the supply of the parts 8 is short in the storage chamber 13, so that it is possible to continue the working of parts alignment efficiently.

The reference numeral 15 represents a wall. A rotary plate 34 is provided at the rear of this wall 15. The magnet 16 is buried in this rotary plate 34. The reference numeral 35 represents an elastic body which is provided between the magnet 16 and the rotary plate 34 so as to press the magnet 16 against the wall 15.

Figure 3:
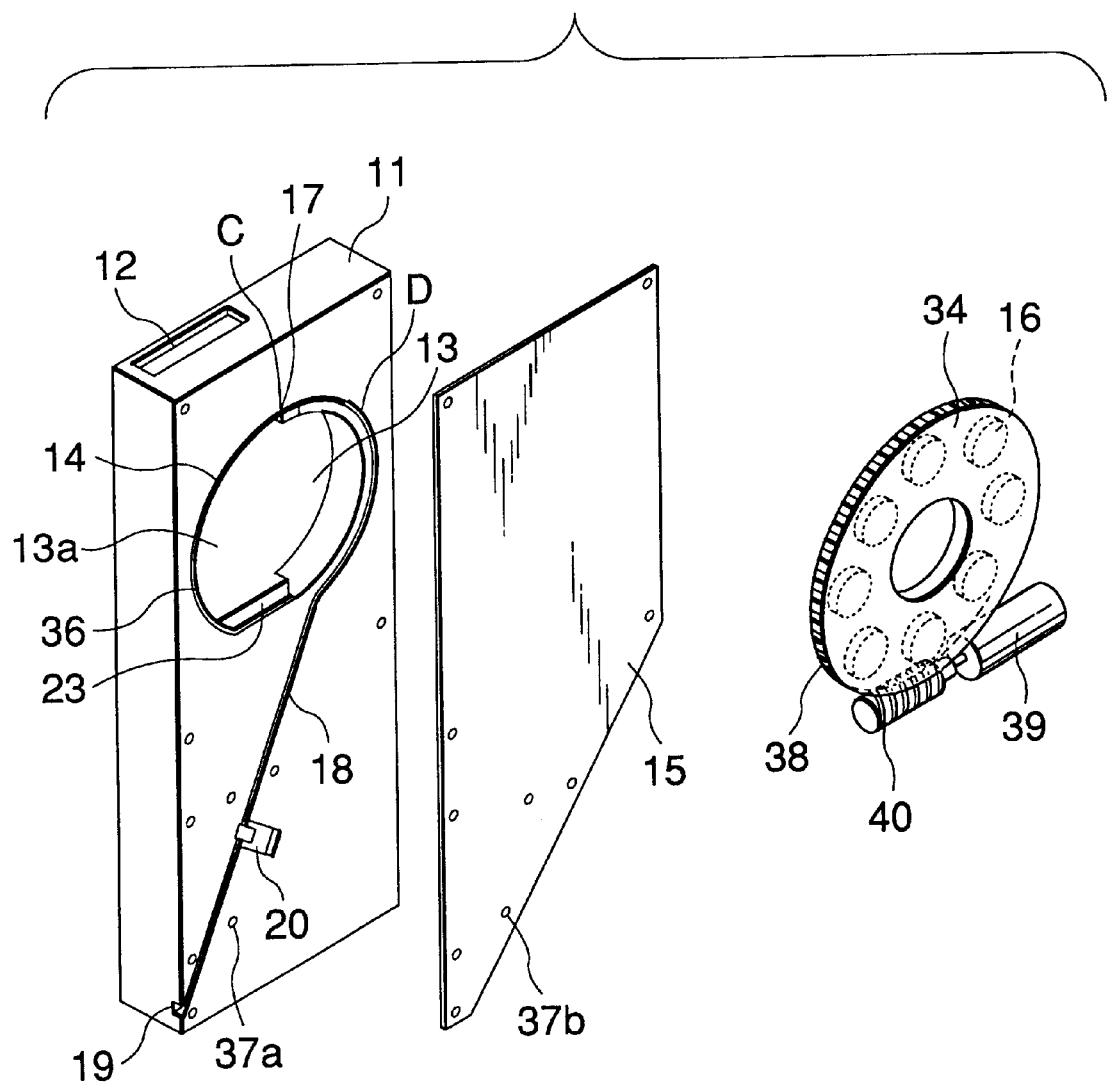
FIG. 3 is a main part exploded perspective view of the first embodiment.

FIG. 3 is an exploded perspective view showing a main part of a parts alignment device. In FIG. 3, the reference numeral 11 represents a body case. This body case 11 is formed of aluminum. A front surface 13a of the storage chamber 13 is formed of transparent acryl in order to confirm the parts 8 stored in the storage chamber 13 or an auxiliary storage chamber 21 by eye observation. The reference numeral 17 represents an intake port for the parts 8. This intake port 17 is quadrilateral, and formed so that each side thereof is larger than the shorter side of the minimum section of the rectangular parts 8, and smaller than the longer side of the same minimum section. As a result, the respective parts 8 are aligned in the minimum size of the parts. Accordingly, it is possible to make a passageway 18 minimum, so that it is possible to make the device thin. As described above, the shape of the intake port 17 is substantially identical with the shape of the parts 8. Accordingly, when the sectional shape of the parts 8 is square, also the intake port 17 is square. When the sectional shape of the parts 8 is rectangle, also the intake port 17 is rectangle. As for the position where this intake port 17 is formed, it is important that the intake port 17 is provided between a position C at the highest point of an arc-like guide 14 of the storage chamber 13 and a position D rotated from the position C by an angle of about 45 degrees in the rotation direction of a rotary plate 34. In this embodiment, the intake port 17 is provided in the position rotated from the point C by an angle of about 10 degrees. By providing the intake port 17 in such a position, not only the parts 8 not-aligned are separated at once and fall down, but also the-parts storage space of the storage chamber 13 can be used sufficiently.

The reference numeral 36 represents a groove which is provided so as to extend from a lower portion 23 of the storage chamber 13 to the intake port 17. This groove 36 is smoothly connected to the passageway 18 through the intake port 17. This groove 36 forms a recess portion in cooperation with a wall 15. The parts 8 are aligned in this recess portion in the longitudinal direction of the parts 8 by the attracting force of a magnet 16. Since the groove 36 for alignment is also provided between the lower portion 23 of the storage chamber 13 and the intake port 17 in such a manner, the chance for the parts 8 to be aligned is increased on a large scale, so that the speed of alignment is improved.

The passageway 18 is formed by a concave groove (formed of aluminum) formed in the body case 11 and the wall 15 abut against the opening of the concave groove. That is, the passageway 18 is formed by screwing holes 37a provided in the body case 11 and holes 37b provided in the wall 15 down to each other so as to bring the wall 15 into tight contact with the groove. This passageway 18 is led downward at an angle of about 45 degrees so that the parts 18 can fall down spontaneously, and the passageway 18 is continued to an outlet 19 provided in the lower side surface of the body case 11. The reference numeral 20 represents a detection sensor. Since the one-side opening of the groove abuts against the wall 15 in such a manner, it is possible to perform the maintenance of the passageway 18 easily by detaching the wall 15.

The wall 15 is formed of non-magnetic material. In this embodiment, stainless steel material 0.3 mm thick with its both sides coated with Teflon is used. Being coated with Teflon at its both sides, the wall 15 can slide smoothly so that the friction with the parts 8 or with the magnet 16 is small, and the parts are hardly damaged.

The reference numeral 34 represents a rotary plate. A plurality of magnets 16 are buried in the rotary plate 34. A worm wheel 38 is provided on the outer circumference of the rotary plate 34, and geared with a worm gear 40 fixed to a shaft of a DC motor 39. The DC motor 39 is disposed parallelly with the rotary plate 34. That is, since the storage chamber 13 and the rotary plate 34 are provided so as to erect on the horizontal plane, also the DC motor 39 is provided erectly. Thus, since the DC motor 39 and the rotary plate 34 are provided erectly, it is possible to make the device thin. Since the worm gear 40 is used, the capacity of the DC motor 39 may be small, so that the DC motor 39 can be miniaturized. Since the DC motor 39 is used as a driving means for the rotary plate 34, the rotation speed can be controlled by changing the DC voltage, so that the control is easy. Further, the device can be produced at a low price.

Figure 4:
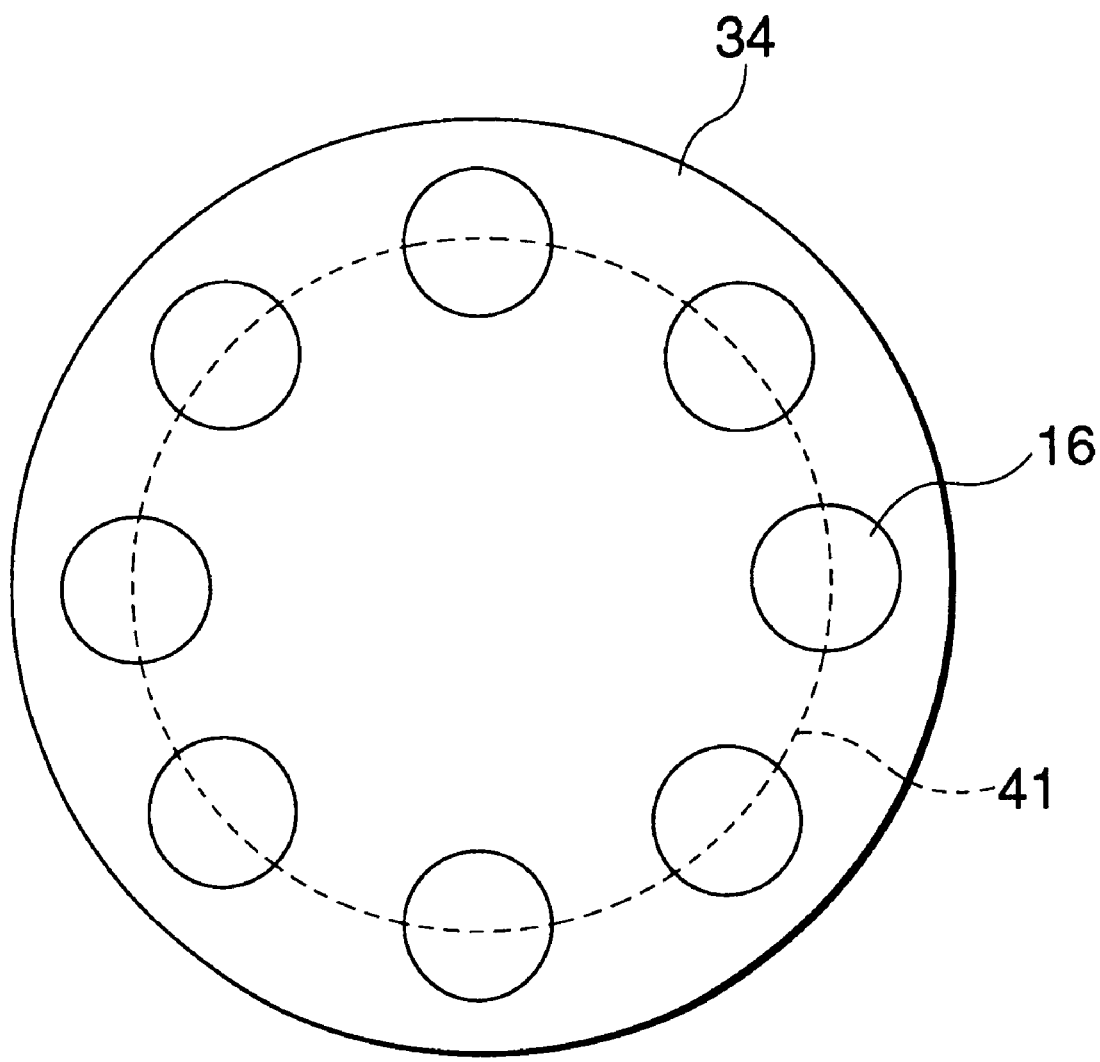
FIG. 4 is a front view of a rotary plate constituting a main part of the first embodiment.

FIG. 4 is a front view of the rotary plate 34. Since this rotary plate 34 is formed of polyacetal which is non-magnetic material, the buried portion of the magnets 16 may be formed easily. Since resin is used for the rotary plate 34, the rotary plate 34 is light in weight and low in price. Since eight magnets 16 are buried inside the outer circumference of this rotary plate 34 at intervals 41, the speed to deal with the parts 8 during one rotation is about 8 times as high as that in the case of using one magnet 16. Each interval 41 (10 mm) substantially equal to the width (12 mm) of each of the magnets 16 is provided between adjacent ones of the magnets 16. Therefore, the parts 8 not-aligned are made to fall down to the storage chamber 13 surely by the effect of the intervals 41. This interval 41 is set to a minimum value so that the parts 8 which cannot flow into the intake port 17 are allowed to fall down into the storage chamber 13 surely.

Figure 5A:
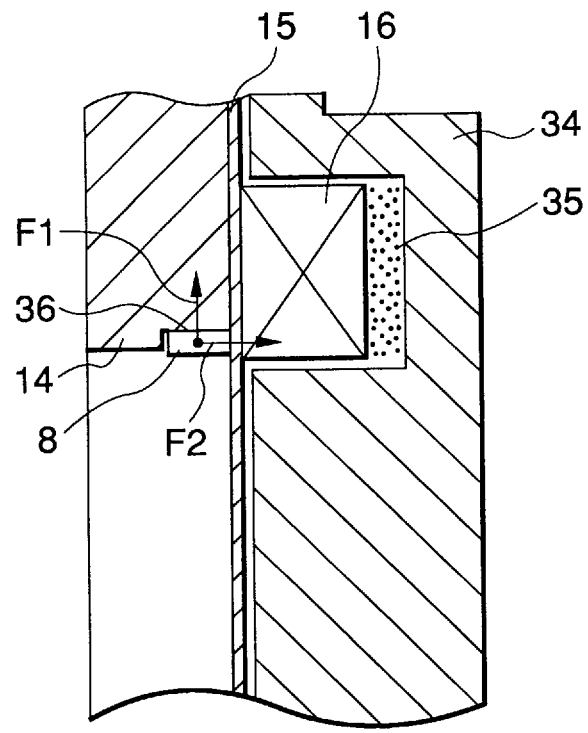
FIG. 5A is a main part sectional view of the first embodiment, showing a first state in which a portion near a guide of a storage chamber constituting a main part is viewed from side.
Figure 5B:
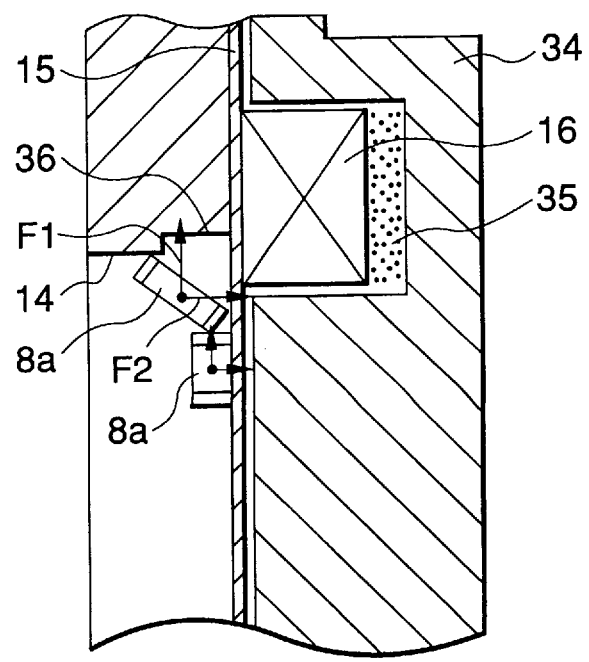
FIG. 5B is a main part sectional view of the first embodiment, showing a second state in which the portion near the guide of the storage chamber constituting a main part is viewed from side.

FIGS. 5A and 5B are main part sectional views viewed from a side near the guide 14 of the storage chamber 13. In FIGS. 5A and 5B, the reference numeral 14 represents a guide; and 15, a wall; and 16, a magnet buried in the rotary plate 34. By this magnet 16, the parts 8 are attracted toward the guide 14 by a force F1, and, at the same time, attracted toward the wall 15 by a force F2. Here, the guide 14 and the magnet 16 are disposed so that the attracting forces F1 and F2 are substantially equal to each other. Since the parts 8 are attracted in a well-balanced state by substantially equal forces in the direction of the guide 14 and in the direction of the wall 15, the parts 8 are put easily in the corner defined by the guide 14 and the wall 15, so that the efficiency of alignment is improved.

The reference numeral 35 represents an elastic member inserted between the magnet 16 and the rotary plate 34 so that the elastic member 35 presses the magnet 16 against the wall 15. Since the elastic member 35 is inserted in such a manner, the magnet 16 is always pressed against the wall 15 by a constant force, so that a uniform attracting force is given to the parts 8. By the elastic member 35, there is no fear that the magnet 16 rattles or generates an abnormal noise.

Although a sponge is used as the elastic member 35 in this embodiment, a plate spring, a coil spring, rubber, or the like, may be used. As the magnet 16, a magnet having a magnetic force of about 4,000 gausses is used in this embodiment.

Figure 6:
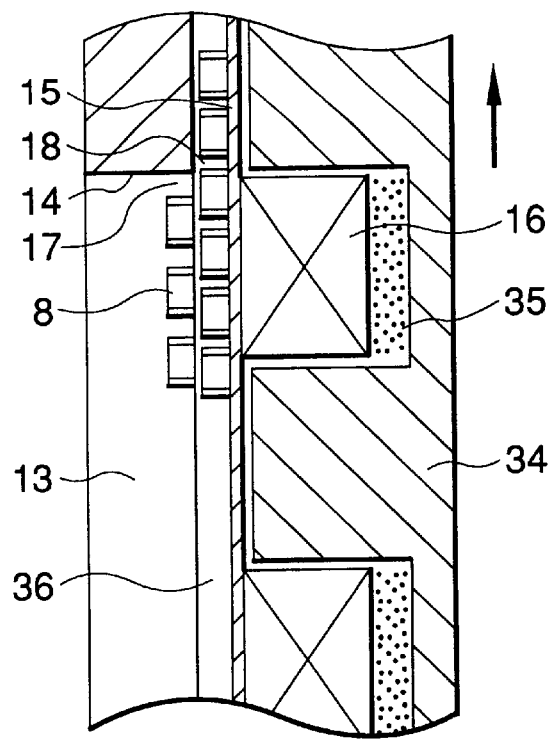
FIG. 6 is a main part sectional view of the first embodiment, showing the state where a portion near an intake port of the storage chamber constituting a main part is viewed from bottom.
Figure 7:
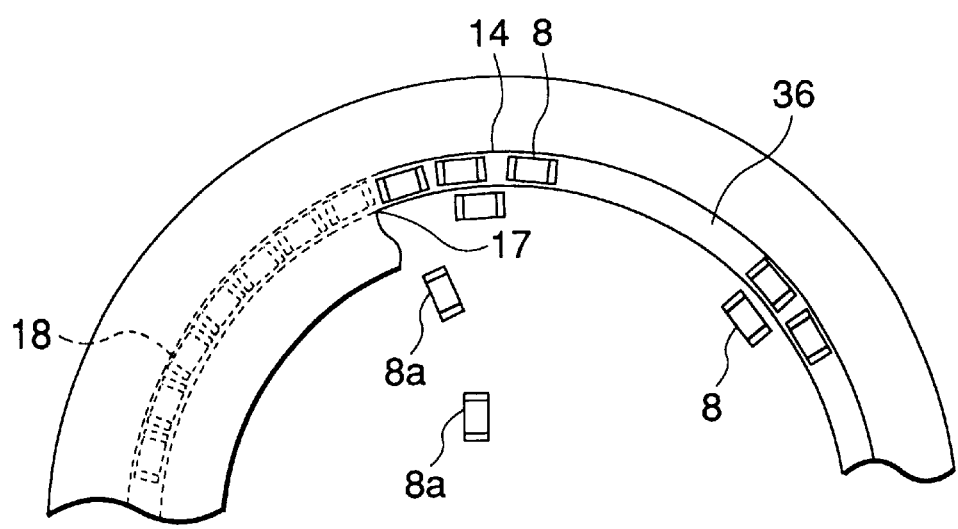
FIG. 7 is a main part front view of the first embodiment, showing the state where the portion near the intake port of the storage chamber constituting a main part is viewed from front.

FIG. 5A shows a state where the parts 8 are aligned along the guide 14 and the wall 15 (in most cases, the parts 8 are aligned as shown in this drawing). When the parts 8 are aligned in such a manner, the parts 8 are taken in through the intake port 17 smoothly, and flow into the passageway 18 in the state where the parts 8 are aligned, as shown in FIG. 6. However, when the parts 8 are not in tight contact with the guide 14 and the wall 15 (the parts 8 are not aligned) as shown in FIG. 5B, the parts 8a cannot be taken in through the intake port 17, and fall down to the lower portion of the storage chamber 13, as shown in FIG. 7. The parts 8a fallen down is attracted and aligned by the magnet 16 again, and taken in through the intake port 17. Even if the parts 8 are stuck by any causes at the intake port 17, the parts 8 are then returned to the previous position by a magnetic force of the magnet 16 approaching the intake port 17 by rotation of the rotary plate 34 and fall down to the storage chamber 13. Accordingly, there is no fear that such a state where the parts 8 are stuck at the intake port 17 is kept.

In FIG. 1, a groove 12a directly connected to a parts storage case supplied from a parts maker is provided in the input port 12. Accordingly, it is possible to connect the parts storage case to the input port 12 directly, so that the working efficiency is improved.

Figure 8A:
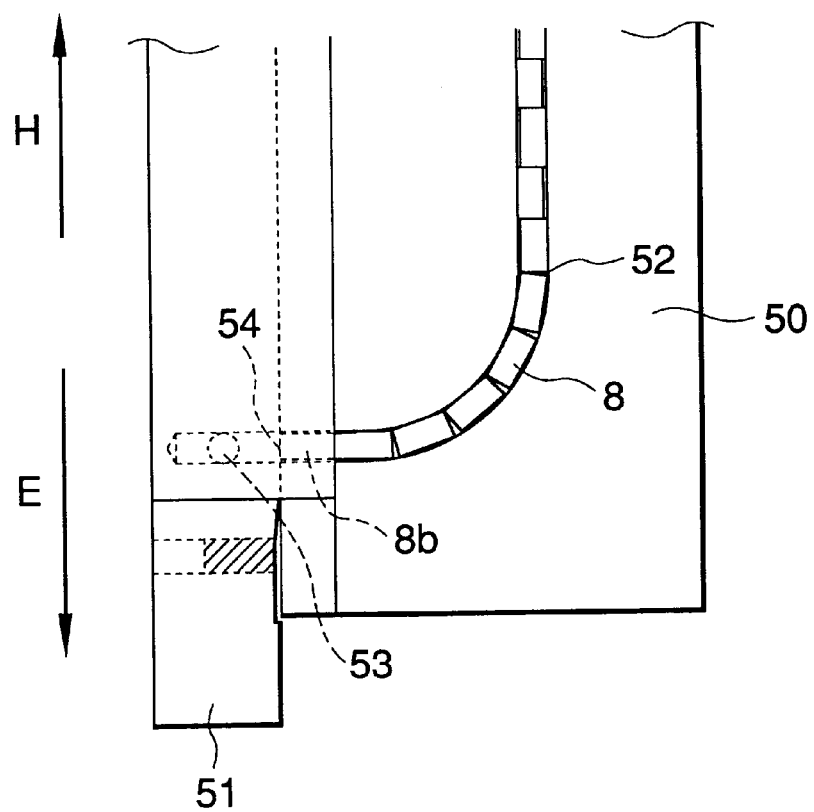
FIG. 8A is a main part plan view of the first embodiment, showing a first state of a parts separation portion connected to an outlet of a passageway.
Figure 8B:
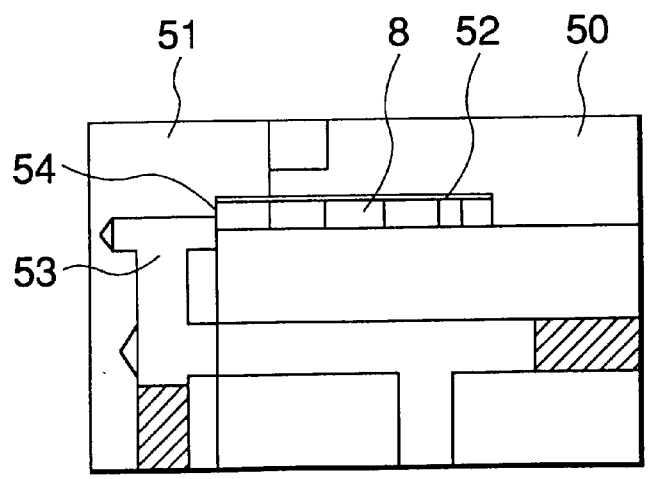
FIG. 8B is a side view of the first embodiment, showing the first state of the parts separation portion.

A parts separation portion for separating the parts 8 individually is connected to the outlet 19 of the passageway 18. It is therefore possible to supply the parts 8 one by one to a printed board or the like through a nozzle. Description will be made about the parts separation portion with reference to FIGS. 8A to 9B. In FIG. 8A, the reference numeral 50 represents a body of a parts separation portion; 51, a shutter provided movably in the direction E or in the direction H; and 52, a passageway provided in the body 50 and connected to the outlet 19 smoothly. The parts 8 are aligned in this passageway 52, and these parts 8 are drawn by a vacuum draw port 53. Of the drawn parts 8, parts 8b in the front abut against an abutment surface 54 of the shutter 51, and therefore stop.

Figure 9A:
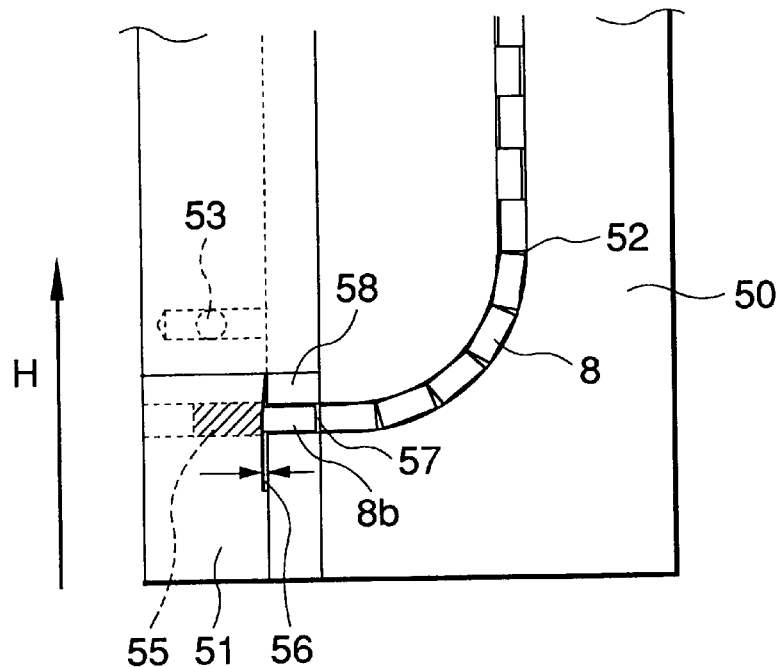
FIG. 9A is a main part plan view of the first embodiment, showing a second state of the parts separation portion connected to the outlet of the passageway.
Figure 9B:
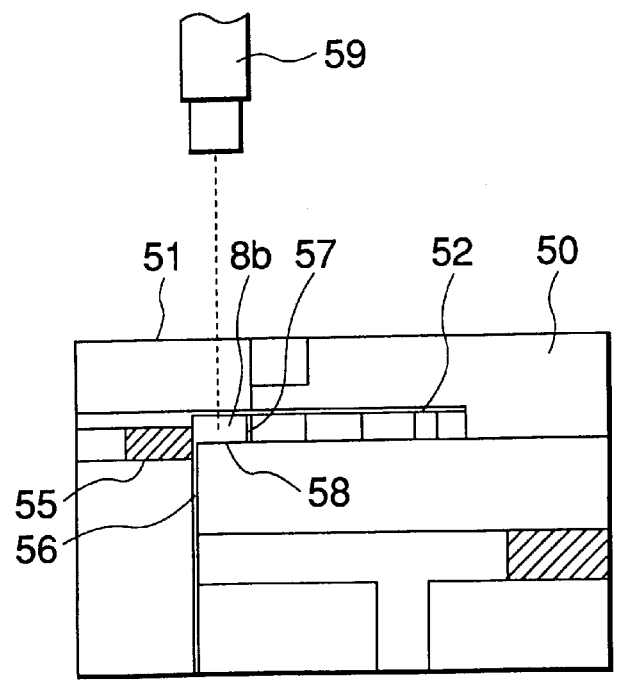
FIG. 9B is a side view of the first embodiment, showing the second state of the parts separation portion.

Next, the shutter 51 is moved in the direction H so as to make the parts 8b, which had abutted against the abutment surface 54 and therefore stopped, moved and stopped in the position of a magnet 55 as shown in FIG. 9A. Then, draw of the parts 8 by the vacuum draw port 53 is stopped, while the parts 8 are attracted by the magnet 55, so that an interval 57 is provided between the parts 8b and the next parts 8 correspondingly to the size of a gap 56 (about 0.3 mm). That is, only the parts 8b are separated and put on a parts supply table 58 of the body 50. The separated parts 8b are drawn by a nozzle 59 and attached to a printed board or the like, as shown in FIG. 9B. Since the parts 8b are separated by the magnet 55 after they are vacuum-drawn in such a manner, there is no fear that the parts 8b are damaged.

The above parts separation portion may be used for the parts alignment device having an another structure.

Figure 10A:
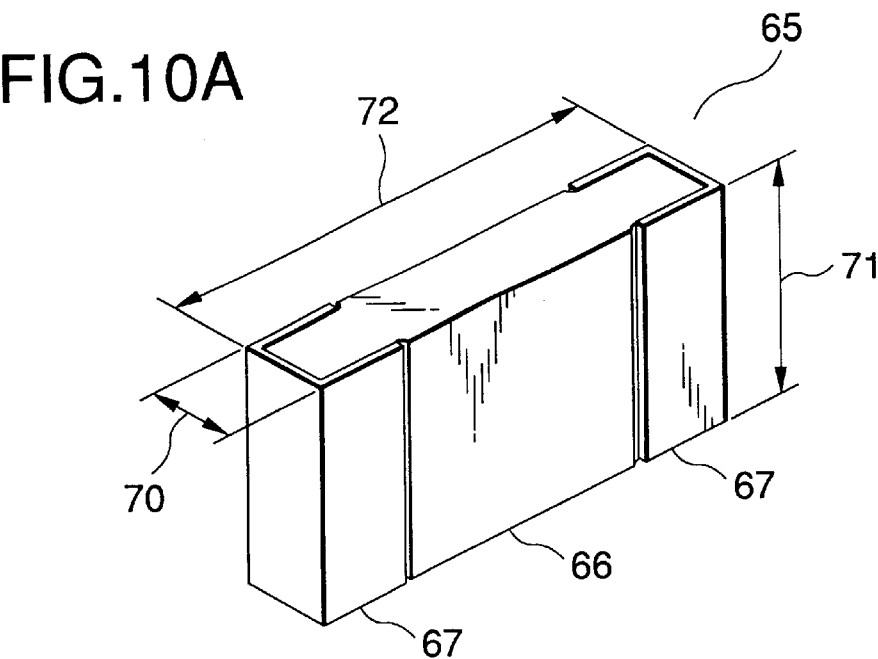
FIG. 10A is a perspective view of first parts of the invention.
Figure 10B:
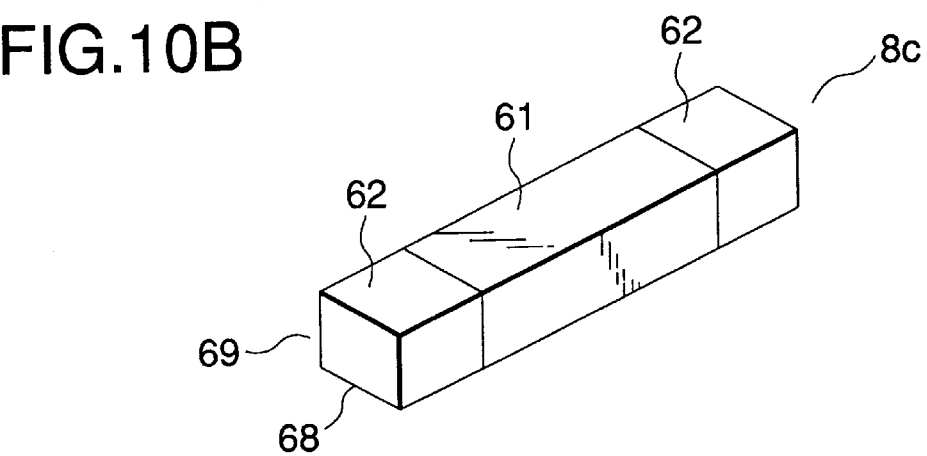
FIG. 10B is a perspective view of second parts of the invention.
Figure 10C:
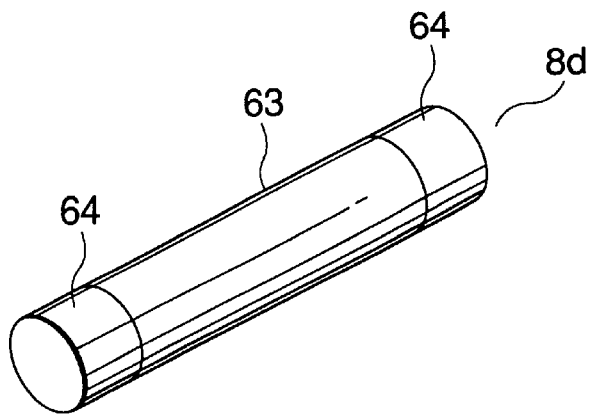
FIG. 10C is a perspective view of third parts of the invention.

Here, FIGS. 10A to 10C show the shape of parts to be aligned. Parts 65 are of a rectangular parallelepiped 66 having the rectangular section and having opposite ends covered with metal electrodes 67 of a magnetic substance, as shown in FIG. 10A. Each of the electrodes 67 has a U-shaped section and attached such that the opposite sides of the U-shape are provided in parallel with the front and back surfaces corresponding to the longer sides of the rectangular section, while the bottom side of the U-shape connected to the opposite sides of the U-shape at the end surface of the rectangular parallelepiped 66. Further, parts 8c shown in FIG. 10B are chip parts of a rectangular parallelepiped 61 having a section of substantially square and having opposite ends covered with metal electrodes 62 of a magnetic substance. In addition, parts 8d shown in FIG. 10C are chip parts of a cylindrical shape 63 having opposite ends covered with metal electrodes 64 of a magnetic substance. In either case, the respective sectional shapes of an intake port 17 for the parts 8c, 8d or 65, and a passageway 18 connected to this intake port 17 are made substantially to correspond to the sectional shape of these parts 8c, 8d or 65 (Exactly, the sectional shapes of the intake port 17 and the passageway 18 connected to this intake port 17 are made to be a little larger than that of the parts 8c, 8d or 65). In the first embodiment, although the parts 65, 8c and 8d can be aligned, such parts 8c or 8d having no directional property in the section of their aligned surface are aligned efficiently.

(Second Embodiment)

This second embodiment is different from the first embodiment in the shape of parts to be aligned, the shape of magnet and the attachment of the magnet. Description will be made mainly about these points. FIGS. 1 to 9 are used also in the second embodiment, and the same parts are referenced correspondingly.

In the second embodiment 2, description will be made about the parts 65 having a directional property in the section of their aligned surface, as shown in FIG. 10A.

In a case of aligning the parts 8c, since the height 68 and width 69 of the section of the parts 8 are substantially equal to each other, there is no problem for alignment of the parts that either the surface in the height 68 or the surface in the width 69 of the parts 8 abuts against the wall 15. On the other hand, in the parts 65, the height 70 and width 71 are different from each other. Accordingly, the efficiency of intake of the parts 65 into the intake port 17 varies in accordance with the fact that the parts 65 are aligned while abutting against the wall 15 with either one of the surface in height and the surface in width. (In the parts 65 in the second embodiment, the height 70 is 0.45 mm, the width 71 is 0.8 mm, and the length 72 is 1.6 mm.)

Figure 11A:
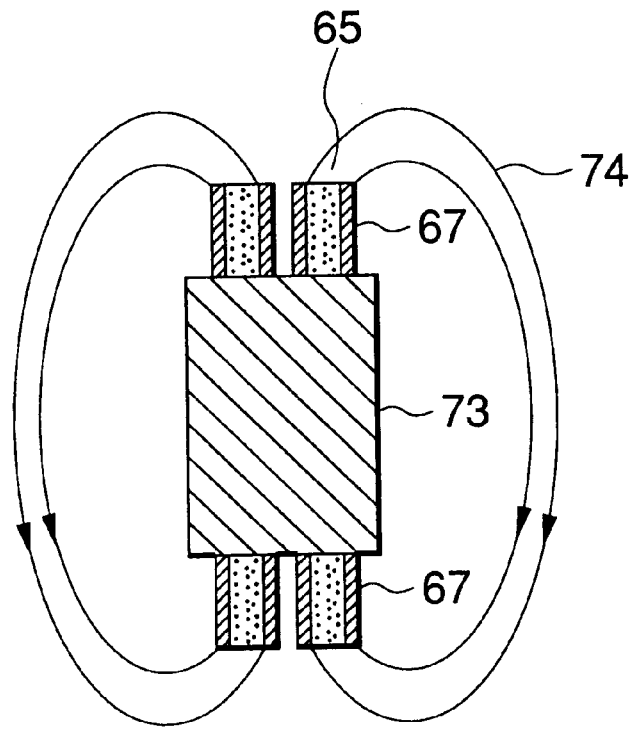
FIG. 11A is a sectional view showing the operation of a magnet for explaining a second embodiment of the invention.
Figure 11B:
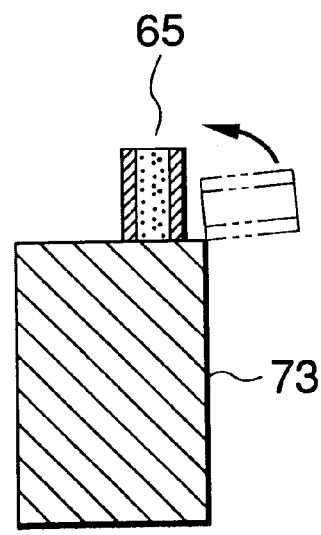
FIG. 11B is a sectional view of the second embodiment, for explaining the alignment of parts.

Then, when the parts 65 are made to approach a magnet 73, the parts 65 are erected so that the electrodes 67 are put in the same direction as magnetic flux 74 as shown in FIG. 11A. In such a manner, the parts 65 are aligned along the magnetic flux 74 in FIG. 11A. That is, the magnetic reluctance of the electrodes 67 of the parts 65 is so small that the parts 65 are erected in one direction on the magnet 73 (The parts 65 are erected vertically to the magnet 73 so that the bottom surface formed by the height 70 and the length 72 is put down). Therefore, the parts 65 are aligned in one direction by positively using this character of the magnet 73 in the second embodiment. Since the parts 65 are erected so as to turn their faces in one direction as mentioned above, it is possible to align the parts 65 at a high speed substantially equal to the parts 8c or 8d in the first embodiment.

Figure 12A:
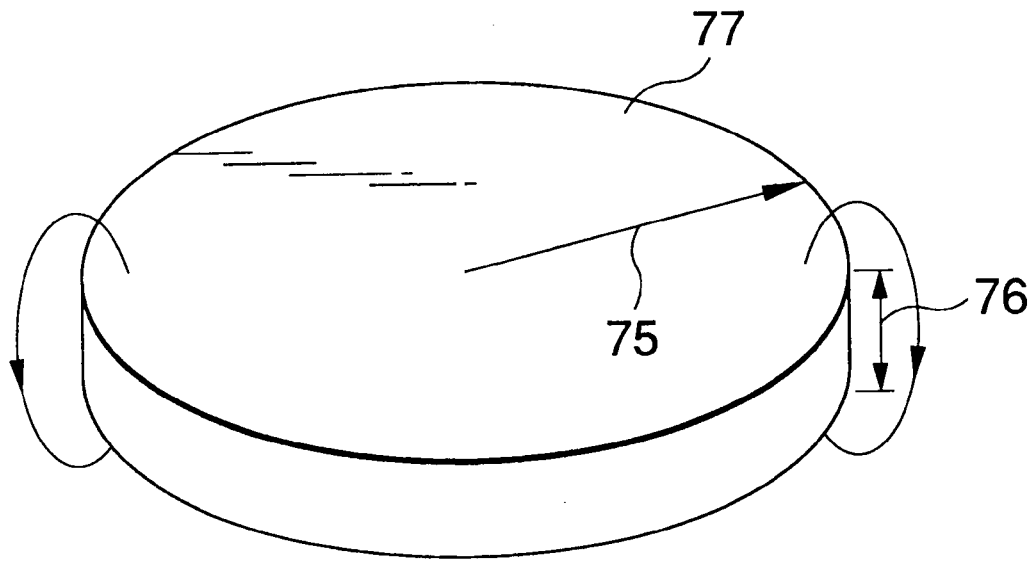
FIG. 12A is a perspective view of a mother magnet for explaining a process for forming a magnet of the second embodiment.
Figure 12B:
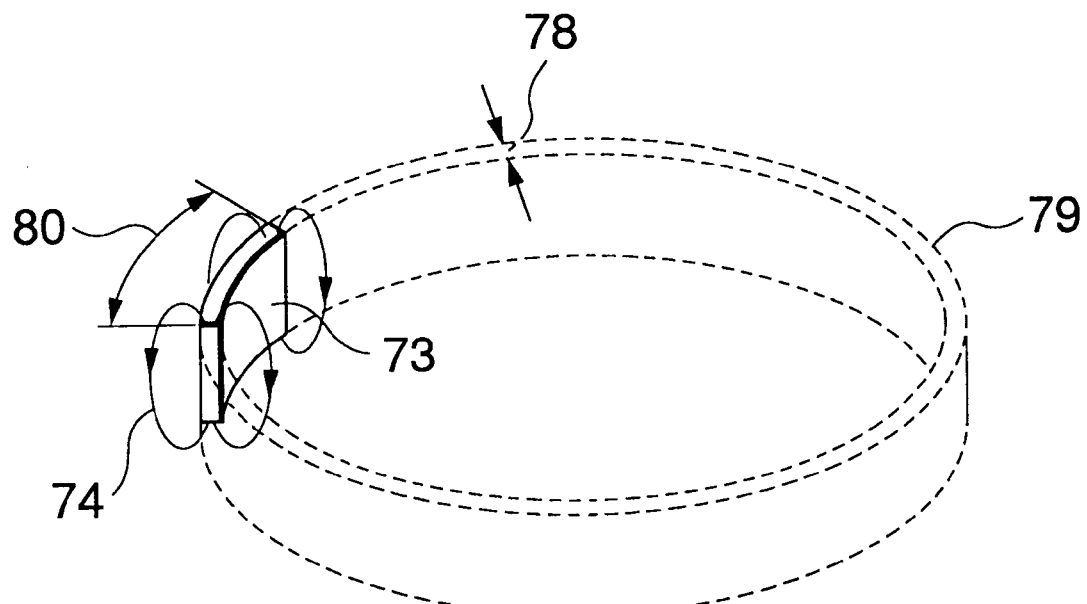
FIG. 12B is a perspective view of a child magnet cut out of the mother magnet in the second embodiment.

Next, this magnet 73 is formed as shown in FIGS. 12A and 12B. That is, FIG. 12A shows a circular magnet (the intensity is about 5,000 gausses) having a radius 75 of about 30 mm (this shows a curvature substantially equal to that of the arc-like guide 14), and having a length 76 of about 3 to 5 mm. The outer circumferential portion of the magnet 73 is cut out so as to obtain a cylindrical magnet 79 having a width 78 of about 2 mm as shown in FIG. 12B. This cylindrical magnet 79 is further cut into a magnet 73 having a length 80 (about 5 mm). At this time, the magnetic flux 74 becomes perpendicular to a plane of the width 78 and the length 80. Here, although it is preferable that the width 78 of the magnet 73 is narrower (substantially corresponding to the width of the parts 65), the width 78 is set to a value described above from limitations on manufacturing or strength. This magnet 73 is longer than the length 72 of the parts 65. Consequently, the parts 65 are aligned in the arc direction of the guide 14 surely.

Figure 13:
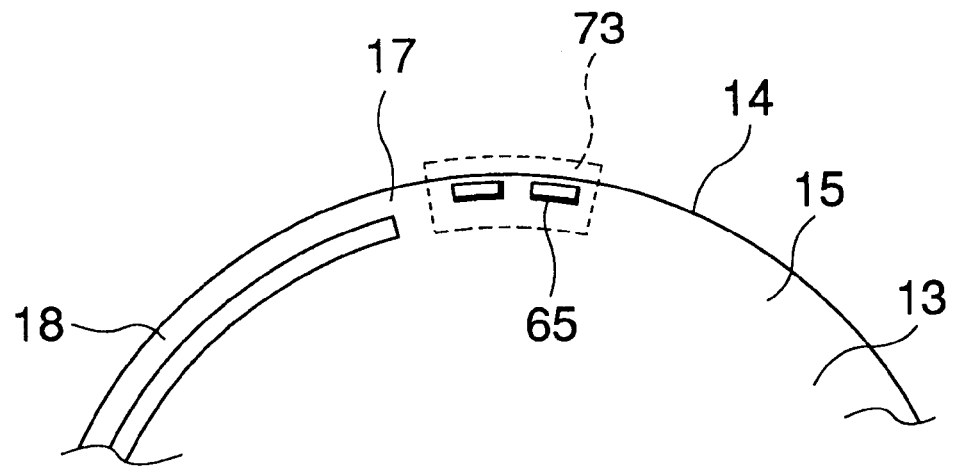
FIG. 13 is a main part front view of a parts alignment device of the second embodiment.

The thus formed magnet 73 is buried in a rotary plate 34 provided beyond a wall 15 of a storage chamber 13 as shown in FIG. 13. The magnet 73 is buried in such a position that the magnet 73 passes behind an intake port 17 and the magnetic flux 74 intersects the wall 15 perpendicularly. This magnet 73 is provided along the guide 14 through the rotary plate 34. In such a manner, since the parts 65 are aligned to face the intake port 17 in one direction which they are erected in one direction, so that the parts 65 can be taken in efficiently.

Next, in FIG. 1, the intake port 17 is provided between a position at the highest point of the arc-like guide 14 of the storage chamber 13 and a position rotated from the highest point by an angle of about 45 degrees in the direction opposite to the rotation of the rotary plate 34. As a result, the parts 65 are taken in through the intake port 17 before reaching the position at the highest point of the arc-like guide 14. That is, the agitation of the parts 65 in the storage chamber 13 is reduced, so that dirt or the like of the parts 65 is reduced. This is a particularly important thing for the parts 65 angled like resistors. Since a DC motor is used as a motor 39 for rotating the rotary plate 34, the rotation speed can be controlled by a voltage easily. It is therefore possible to control the speed of alignment of the parts 65 in accordance with necessity.

As for the attachment of this magnet 73, the manner in the first embodiment applies to the second embodiment. That is, a plurality of magnets 73 may be provided in the rotary plate 34, and an elastic member 35 may be provided between the rotary plate 34 and the magnet 73 so as to press the magnet 73 against the wall 15, and so on.

(Third Embodiment)

Figure 14:
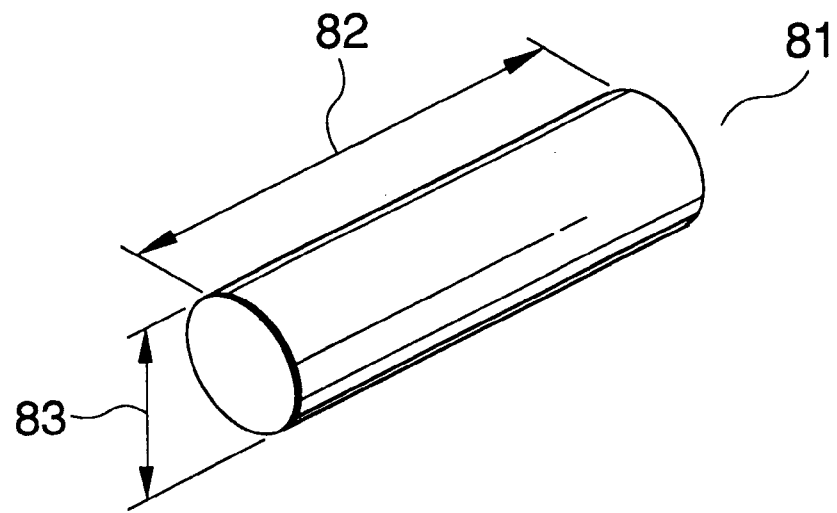
FIG. 14 is a perspective view of parts used in a third embodiment of the invention.
Figure 15:
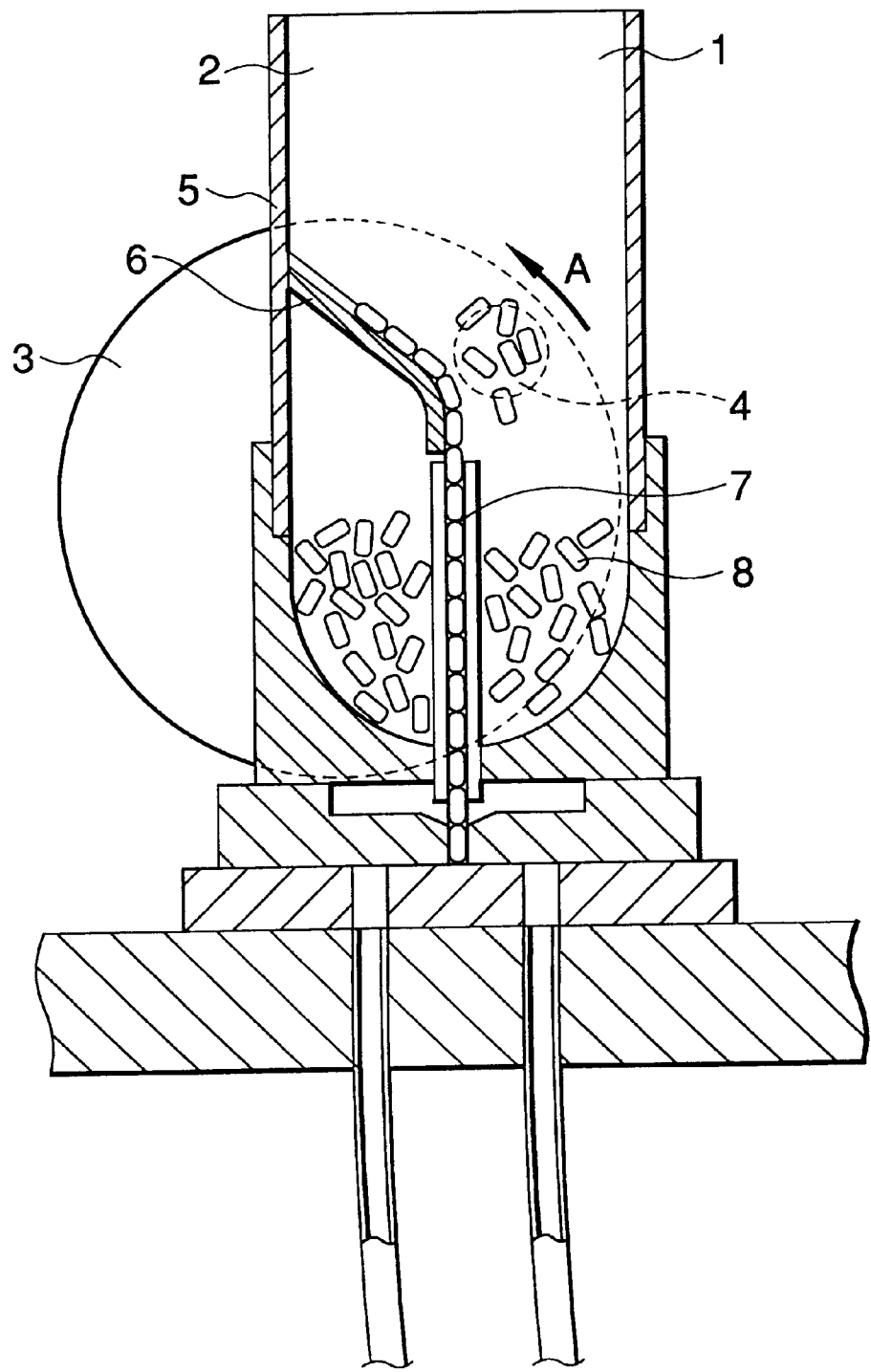
FIG. 15 is a sectional view of a conventional parts alignment device.

In a third embodiment, parts to be aligned are those which are shown by the reference numeral 81 in FIG. 14. This point is considerably different from the parts 65 in the second embodiment. That is, as for the material of the parts 81 in the third embodiment, a very small amount of iron is contained in brass, so that the parts 81 are attracted by the magnets 73 while substantially keeping the electrical conductivity of brass. In detail, the material of the parts 81 contains copper of about 97.2%, zinc of about 0.4%, and iron of 2 to 3%. In this third embodiment, superior result was obtained when iron of 2.4% was contained. As for the outer dimensions of these parts 81, they are shaped into a cylinder having a length 82 of 2.0 mm (1.6 mm to 3.2 mm), and a diameter 83 of 0.6 mm.

It is a different point of the third embodiment from the embodiment 2 that an intake port 17 is provided at a position rotated from the highest point of an arc-like guide 14 of a storage chamber 13 by an angle of about 40 degrees in the rotation direction of the rotary plate 34. It is preferable to set this angle to be in a range of from 10 degrees to 45 degrees. By providing the intake port 17 with such an angle, the parts 81 are taken in through the intake port 17 after passing through the position at the highest point of the arc-like guide 14. This means that with respect to the parts 81 which are not taken into the input port 17 and fall down into the storage chamber 13, first-in first-out of the parts 81 in the storage chamber 13 can be realized. This is an important thing on the parts management.

As described above, according to a first aspect of the present invention, there-is provided a parts alignment device including: an input port for introducing chip-like parts having a magnetic-substance electrode; a storage chamber for storing the parts introduced through the input port, a wall of non-magnetic material formed to define a back surface of the storage chamber; an arc-like guide of non-magnetic material provided at least above the storage chamber; an intake port provided in connection with the guide and for taking-in only parts aligned in a predetermined direction from the parts; a parts passageway connected to the intake port and provided toward downstream; a rotary plate of non-magnetic material provided at the rear of the wall so as to rotate in the parts taking-in direction of the intake port; and a magnet provided on the rotary plate so that the parts are attracted both in a direction of the guide and in a direction of the wall simultaneously by a magnetic force of the magnet. With this configuration, a plurality of parts are attracted to the guide surface and to the wall surface simultaneously by the rotation of the rotary plate provided with a magnet. Accordingly, most of the parts are aligned while they rotates with the rotary plate. Reaching the intake port in this state, the parts aligned in a predetermined direction relative to this intake port are taken in, and flow toward the downstream in the passageway. On the other hand, the parts which are not aligned at the intake port cannot be taken into the intake port so that they fall down. In such a manner, parts are attracted to the guide surface and to the wall surface simultaneously before they flow into the intake port. Therefore, most of the parts are already aligned on the guide surface before they flow into the intake port. Accordingly, the parts alignment speed becomes high.

According to the first aspect of the invention, in the above parts alignment device, the shape of the intake port may be formed to be a little larger than the shape of the minimum sectional area of the parts. Since the parts intake port is formed into such a shape, respective parts are aligned in the minimum sectional area portion of the parts. It is therefore possible to make the aligned parts passageway minimum, so that it is possible to make the device thin.

According to the first aspect of the invention, in the above parts alignment device, the passageway may be defined by three sides of U-shaped grooves on the body case and one opened side abutting against the wall. Since one side of the passageway abuts against the wall, the maintenance of the passageway can be performed easily by detaching this wall.

According to the first aspect of the invention, in the above parts alignment device, an arc-like guide may be provided between a lower portion of the storage chamber and the intake port, and a groove for aligning the parts in one direction is provided between the guide and the wall. Since a groove for alignment is provided between the lower portion of the storage chamber and the intake port, the chance for parts to be aligned along this groove in advance is considerably increased, so that the speed of alignment is improved.

According to the first aspect of the invention, in the above parts alignment device, a plurality of magnets may be buried at intervals in the rotary plate. Since a plurality of magnets are buried, the speed of dealing with parts during one rotation increases correspondingly to the number of magnets, in comparison with the case of one magnet. Since an interval is provided between the magnets adjacent to each other, parts which are not aligned can be made to fall down to the storage chamber surely by this interval.

According to the first aspect of the invention, in the above parts alignment device, the interval between the magnets may be set to be substantially equal to a width of each of the magnets. Since the interval is made substantially equal to the width of each magnet, the magnets are provided as much as possible so that the parts which cannot flow into the intake port can fall down to the storage chamber surely. Accordingly, it is possible to deal with parts at the highest speed.

According to the first aspect of the invention, in the above parts alignment device, the rotary plate may be formed of resin material. Since the rotary plate is formed of resin, not only the portion where the magnets are buried can be formed easily, but also the rotary plate becomes light in weight.

According to the first aspect of the invention, in the above parts alignment device, the magnetic force applied to the parts may attract the parts substantially equally in the guide direction and in the wall direction. The parts are attracted in a well-balanced state by a substantially equal force in the guide direction and in the wall direction. Accordingly, the parts are put easily in the corner formed by the guide and the wall, so that the efficiency of alignment is improved.

According to the first aspect of the invention, in the above parts alignment device, an elastic member may be inserted between the magnet and the rotary plate. Since the elastic member is inserted, the magnet is always pressed against the wall by a constant force, so that a uniform attracting force can be obtained for the parts. By this elastic member, there is no fear that the magnet rattles or generates an abnormal noise.

According to the first aspect of the invention, in the above parts alignment device, wherein the wall may be formed of stainless steel, fixed to the storage chamber, and coated with Teflon on its both sides. Since the both sides are coated with Teflon, the friction with the parts or the magnet is so small that the parts are hardly damaged.

According to the first aspect of the invention, in the above parts alignment device, wherein the intake port may be provided between the position at the highest point of the arc-like guide of the storage chamber and the position rotated from the highest point by an angle of about 45 degrees in the rotation-direction of the rotary plate. Since the intake port is provided between the position at the highest point of the arc-like guide and the position rotated from the highest point by an angle of about 45 degrees in the rotation direction of the rotary plate, first-in first-out of the parts can be realized in the storage chamber.

According to the first aspect of the invention, in the above parts alignment device, a detection sensor may be provided on the way of the passageway, and the rotary plate is stopped from rotating when the detection sensor detects the fullness of parts. The rotary plate can be stopped from rotating when the passageway is filled with parts. Accordingly, there is no fear that the parts are rubbed excessively and excessive energy is consumed.

According to the first aspect of the invention, in the above parts alignment device, the front surface of the storage chamber may be formed of a transparent member. Since a transparent member is used, it is possible to adjust timing of supplying parts or supply capacity (rotation speed of the rotary plate) suitably by eye observation.

According to the first aspect of the invention, in the above parts alignment device, the passageway may be formed of metal. Since the passageway is formed of metal as described above, the friction of the passageway is reduced so that the reliability of the life can be improved.

According to the first aspect of the invention, in the above parts alignment device, wherein a motor for rotating the rotary plate may be provided substantially in parallel with the rotary plate, and a worm gear may be provided on a shaft of the motor, the worm gear being connected to a worm wheel provided in the outer circumference of the rotary plate to thereby rotate the rotary plate. Since the motor is provided in parallel with the rotary plate, it is possible to realize the device made thin. In addition, since a worm gear is used, the reduction ratio is so large that the output of the motor is enough even if it is small. Accordingly, it is possible to miniaturize the motor.

According to the first aspect of the invention, in the above parts alignment device, the motor is a DC motor. Since a DC motor is used, not only the rotation speed can be easily controlled by changing the DC voltage, but also it is possible to realize the device at a low price.

According to the first aspect of the invention, in the above parts alignment device, a parts separation portion for separating parts individually may be connected to the outlet of the passageway. Since the parts separation portion is connected, it is possible to supply parts one by one by a nozzle.

According to the first aspect of the invention, in the above parts alignment device, after parts is vacuum-sucked and put on a parts supply table, a parts separation portion may move a shutter and attract the parts by a magnet to thereby separate the parts. Since the parts are separated by the magnet after they are vacuum-sucked, there is no fear that the parts are damaged.

According to the first aspect of the invention, in the above parts alignment device, a groove may be provided in the input port so as to be connected to a parts storage case directly. Since a parts storage case supplied from a parts maker can be connected to the input port directly, the working efficiency is improved.

According to the first aspect of the invention, in the above parts alignment device, parts put-in from the input port may be once stored in an auxiliary storage chamber, and then supplied from a lower portion of the storage chamber. Since parts are supplied from the lower portion of the storage chamber, the number of parts always stored in the storage chamber, becomes small. Therefore, the number of parts moved by the magnet in the storage chamber is small. That is, the number of parts subjected to unnecessary friction is small. On the other hand, a suitable quantity of parts are always supplied from the auxiliary storage chamber to the storage chamber. Accordingly, there is no fear that the supply of the parts is short, and the working of alignment of the parts can be continued efficiently.

According to a second aspect of the invention, there is provided a parts alignment device including: an input port for introducing chip-like parts having magnetic-substance electrodes at least on the front surface and the back surface at its opposite ends and being formed into substantially rectangular parallelepiped; a storage chamber for storing the parts introduced through the input port; a wall of non-magnetic material formed to define a back surface of the storage chamber; an arc-like guide of non-magnetic material provided at least above the storage chamber; an intake port provided in connection with the guide and for taking in the parts; a parts passageway connected to the intake port and provided toward downstream; a rotary plate of non-magnetic material provided at the rear of the wall so as to rotate in the parts taking-in direction of the intake port; and a magnet provided so that magnetic flux intersects the rotary plate perpendicularly and passes behind the intake port. With this configuration, when the rotary plate provided with magnets rotates, the electrodes of plural parts are attracted, and the parts erect perpendicularly to the wall surface, aligned in the arc direction of the guide, and rotated with the rotary plate. Reaching the intake port in this state, the parts are taken in as they are, and flow toward the downstream in the passageway, because the parts are aligned in advance in the same direction as the shape of this intake port. On the other hand, parts which are out of the intake port cannot flow into the intake port so as to fall down, are attracted by the magnet again, and rotate together with the rotary plate. In such a manner, parts erect in the same direction as the magnetic flux of the magnet while being aligned in the arc direction of the guide before flowing into the intake port. Accordingly, the parts flow into the intake port efficiently.

According to the second aspect of the invention, in the above parts alignment device, the length of the magnet may be larger than the length of the parts. Since the magnet is longer than the parts, the parts are aligned in the arc direction of the guide surely.

According to the second aspect of the invention, in the above parts alignment device, the width of the magnet in the direction perpendicular to the magnetic flux may be smaller than a value five times as large as the width of the intake port. By reducing the width of the intake port as described above, the number of parts which cannot be taken into the intake port and returns the storage chamber again is reduced, so that the parts is protected from an unnecessary external force.

According to the second aspect of the invention, in the above parts alignment device, the magnet may have a curvature substantially equal to that of the arc-like guide. Since the magnet has a curvature equal to that of the guide connected to the intake port, parts are taken into the intake port smoothly.

According to the second aspect of the invention, in the above parts alignment device, a plurality of the magnets may be buried in the rotary plate. Since a plurality of magnets are buried, the speed of dealing with parts during one rotation increases correspondingly to the number of magnets, in comparison with the case of one magnet.

According to the second aspect of the invention, in the above parts alignment device, an interval between the magnets may be set to be substantially equal to the length of the magnets. Parts which cannot flow into the intake port can be made to fall down to the storage chamber surely by this interval.

According to the second aspect of the invention, in the above parts alignment device, an elastic member may be inserted between the magnet and the rotary plate. Since the elastic member is inserted, the magnet is always pressed against the wall by a constant force, so that a uniform attracting force can be obtained for the parts. In addition, because of this elastic member, there is no fear that the magnet rattles or generates an abnormal noise.

According to the second aspect of the invention, in the above parts alignment device, the intake port may be provided between the position at the highest point of the arc-like guide of the storage chamber and the position rotated from the highest point by an angle of about 45 degrees in the direction of backward rotation of the rotary plate. Parts are taken into the intake port before they reach the position at the highest point of the arc-like guide. That is, agitation of the parts in the storage chamber is reduced, so that dirt and so on of the parts are reduced.

According to the second aspect of the invention, in the above parts alignment device, a motor for rotating the rotary plate may be a DC motor. The rotation speed can be controlled easily by voltage. Accordingly, it is possible to control also the speed of alignment of parts easily in accordance with necessity.

According to a third aspect of the invention, there is provided a parts alignment device including: an input port for introducing parts of copper wires containing a very small quantity of iron; a storage chamber for storing the parts introduced through the input port, a wall of non-magnetic material formed to define a back surface of the storage chamber; an arc-like guide of non-magnetic material provided at least above the storage chamber; an intake port provided in connection with the guide and for taking-in only parts aligned in a predetermined direction from the parts; a parts passageway connected to the intake port and provided toward downstream; a rotary plate of non-magnetic material provided at the rear of the wall so as to rotate in the parts taking-in direction of the intake port; and a magnet provided on the rotary plate perpendicularly and passing behind the intake port. With this configuration, when the rotary plate provided with magnets rotates, parts are aligned in the arc direction of the guide and rotated with the rotary plate, because the parts contain iron though copper is a main component of the parts. Reaching the intake port in this state, the parts are taken in as they are, and flow toward the downstream in the passageway, because the parts are aligned in advance in the same direction as the shape of this intake port. On the other hand, parts which are out of the intake port cannot flow into the intake port and fall down so that they are attracted by the magnet again and rotate together with the rotary plate. In such a manner, parts are aligned in the arc direction of the guide before they flow into the intake port. Accordingly, the parts can flow into the intake port efficiently.

According to the third aspect of the invention, in the above parts alignment device, the length of the magnet may be larger than the length of the parts. Since the magnet is longer than the parts, the parts are aligned in the arc direction of the guide surely.

According to the third aspect of the invention, in the above parts alignment device, the width of the magnet in the direction perpendicular to the magnetic flux is smaller than a value five times as large as the width of the intake port. By reducing the width of the intake port as described above, the number of parts which cannot be taken into the intake port and return the storage chamber is reduced, so that the parts are protected from an unnecessary external force.

According to the third aspect of the invention, in the above parts alignment device, the magnet may have a curvature substantially equal to that of the arc-like guide. Since the magnet has a curvature equal to that of the guide connected to the intake port, parts are taken into the intake port smoothly.

According to the third aspect of the invention, in the above parts alignment device, the intake port may be provided between the position at the highest point of the arc-like guide of the storage chamber and the position rotated from the highest point by an angle of about 45 degrees in the direction of rotation of the rotary plate. Parts are taken into the intake port after they pass the position at the highest point of the arc-like guide. That is, with respect to the parts which are not taken into the intake port and fall down to the storage chamber, first-in first-out in the storage chamber can be realized.

According to the third aspect of the invention, in the above parts alignment device, a motor for rotating the rotary plate may be a DC motor. The rotation speed is controlled easily by voltage. Accordingly, it is also possible to control the speed of alignment of parts easily in accordance with necessity.

According to the third aspect of the invention, in the above parts alignment device, parts in which 2% to 3% iron is contained in brass are aligned. By adding iron by such a ratio, the parts can be attracted by the magnet surely while keeping the electrical conductivity of copper sufficiently.

What is claimed is:

1. A parts alignment device comprising:
    an input port introducing chip-like parts having a magnetic-substance electrode;
    a storage chamber storing said parts introduced through said input port;
    a wall made of non-magnetic material, said wall defining a back surface of said storage chamber;
    an arc-like guide made of non-magnetic material and extending from a lower portion of said storage chamber to an intake sort, said intake port being adapted to only take in parts aligned in a predetermined direction, said guide and said wall cooperating to define a groove for aligning said Parts in said predetermined direction;
    a parts passageway connected to said intake port and extending downstream of said intake port;
    a rotary plate made of non-magnetic material and provided at a rear of said wall so as to rotate in a parts taking-in direction of said intake port; and
    a magnet provided on said rotary plate, wherein said magnet attracts said parts both in a direction of said guide and in a direction of said wall simultaneously by a magnetic force thereof.

2. The parts alignment device according to claim 1, wherein a shape of said intake port is formed to be larger than a shape of a minimum sectional area of said parts.

3. The parts alignment device according to claim 1, wherein said passageway is composed by three sides of a U-shaped groove provided in a body case, and said wall abut against one opened side of said groove.

4. The parts alignment device according to claim 1, wherein a plurality of said magnets are buried in said rotary plate at predetermined intervals.

5. The parts alignment device according to claim 4, wherein said predetermined interval between said magnets is substantially equal to a width of said magnet.

6. The parts alignment device according to claim 5, wherein said rotary plate is formed of a resin material.

7. The parts alignment device according to claim 1, wherein said magnetic force attracting said parts is applied substantially equally in the guide direction and in the wall direction.

8. A parts alignment device comprising:
    an input port introducing chip-like parts having a magnetic-substance electrode;
    a storage chamber storing said parts introduced through said input Port;

a wall made of non-magnetic material, said wall defining a back surface of said storage chamber;

an arc-like guide made of non-magnetic material and provided at least above said storage chamber;

an intake port provided in connection with said guide and taking in only parts aligned in a predetermined direction from said parts;

a parts passageway connected to said intake port and provided toward downstream of said intake port;

a rotary plate made of non-magnetic material and provided at a rear of said wall so as to rotate in a parts taking-in direction of said intake port; and a magnet provided on said rotary plate, wherein said magnet attracts said parts both in a direction of said guide and in a direction of said wall simultaneously by a magnetic force thereof and, wherein an elastic member is disposed between said magnet and said rotary plate.

9. The parts alignment device according to claim 1, wherein said wall is formed of stainless steel, fixed to said storage chamber, and coated with a wear resistant material.

10. The parts alignment device according to claim 1, wherein said intake port is provided between a position at the highest point of said arc-like guide and a position rotated from the highest point by an angle of substantially 45 degrees in a rotation direction of said rotary plate.

11. The parts alignment device according to claim 1, wherein a detection sensor is provided along said passageway, and said rotary plate is stopped from rotating when said detection sensor detects that at least a portion of said passageway is full of parts.

12. A parts alignment device comprising:

an input port introducing chip-like parts having a magnetic-substance electrode;

a storage chamber storing said parts introduced through said input port;

a wall made of non-magnetic material, said wall defining a back surface of said storage chamber;

an arc-like guide made of non-magnetic material and provided at least above said storage chamber;

an intake port provided in connection with said guide and taking in only parts aligned in a predetermined direction from said parts;

a parts passageway connected to said intake port and provided toward downstream of said intake port;

a rotary plate made of non-magnetic material and provided at a rear of said wall so as to rotate in a parts taking-in direction of said intake port; and a magnet provided on said rotary plate, wherein said magnet attracts said parts both in a direction of said guide and in a direction of said wall simultaneously by a magnetic force thereof and, wherein a front surface of said storage chamber is formed of a transparent member.

13. The parts alignment device according to claim 1, wherein said passageway is formed of metal.

14. The parts alignment device according to claim 1, further comprising:

a motor rotating said rotary plate, said motor being substantially parallel to said rotary plate;

a worm gear provided on a shaft of said motor; and a worm wheel provided in an outer circumference of said rotary plate and engaging said worm gear, to thereby rotate said rotary plate.

15. The parts alignment device according to claim 14, wherein said motor is a DC motor.

16. The parts alignment device according to claim 1, wherein a parts separation portion separating said parts individually is connected to an outlet of said passageway.

17. A parts alignment device comprising:

an input port introducing chip-like parts having a magnetic-substance electrode;

a storage chamber storing said parts introduced through said input port;

a wall made of non-magnetic material, said wall defining a back surface of said storage chamber;

an arc-like guide made of non-magnetic material and provided at least above said storage chamber;

an intake port provided in connection with said guide and taking in only parts aligned in a predetermined direction from said parts;

a parts passageway connected to said intake port and provided toward downstream of said intake port;

a rotary plate made of non-magnetic material and provided at a rear of said wall so as to rotate in a parts taking-in direction of said intake port; and a magnet provided on said rotary plate, wherein said magnet attracts said parts both in a direction of said guide and in a direction of said wall simultaneously by a magnetic force thereof, and wherein a parts separation portion separating said parts individually is connected to an outlet of said passageway, said parts separation portion comprising:

a parts supply table putting said parts thereon;

drawing unit vacuum-drawing said parts toward said parts supply table;

a shutter abutting said drawn parts to thereby position said parts on said parts supply table; and a second magnet attracting said positioned parts to thereby separate said parts.

18. The parts alignment device according to claim 1, wherein said input port includes a groove.

19. A parts alignment device comprising:

an in-put port introducing chip-like parts having a magnetic-substance electrode;

a storage chamber storing said parts introduced through said input port;

a wall made of non-magnetic material, said wall defining a back surface of said storage chamber;

an arc-like guide made of non-magnetic material and provided at least above said storage chamber;

an intake port provided in connection with said guide and taking in only parts aligned in a predetermined direction from said parts;

a parts passageway connected to said intake port and provided toward downstream of said intake port;

a rotary plate made of non-magnetic material and provided at a rear of said wall so as to rotate in a parts taking-in direction of said intake port;

a magnet provided on said rotary plate, wherein said magnet attracts said parts both in a direction of said guide and in a direction of said wall simultaneously by a magnetic force thereof, and an auxiliary storage chamber storing said parts put-in from said input port, wherein said parts is supplied to a lower portion of said storage chamber through said auxiliary storage chamber.

20. A parts alignment device comprising:

an input port introducing chip-like parts having magnetic substance electrodes at least on the front surface and the back surface at opposite ends thereof, said parts being formed into substantially rectangular parallelepiped shapes;

a storage chamber storing said parts introduced through said input port;

a wall made of non-magnetic material, said wall defining a back surface of said storage chamber;

an arc-like guide made of non-magnetic material and provided at least above said storage chamber;

an intake port provided in connection with said guide and taking in said parts;

a parts passageway connected to said intake port and extending downstream of said intake port;

a rotary plate made of non-magnetic material and provided at the rear of said wall so as to rotate in a parts taking-in direction of said intake port; and a magnet secured to said rotary plate, said magnet having a curvature substantially equal to a curvature of said arc-like guide and being disposed such that magnetic flux from said magnet intersects said rotary plate perpendicularly and passes behind said intake port.

21. The parts alignment device according to claim 20, wherein a length of said magnet is larger than a length of said parts.

22. The parts alignment device according to claim 20, wherein a width of said magnet in a direction perpendicular to the magnetic flux is smaller than a value five times as large as the width of said intake port.

23. The parts alignment device according to claim 20, wherein said arc-like guide extends from a lower portion of said storage chamber to said intake port, and a groove for aligning said parts in one direction is provided between said guide and said wall.

24. The parts alignment device according to claim 20, wherein a plurality of said magnets are buried in said rotary plate.

25. The parts alignment device according to claim 24, wherein an interval between said magnets is set to be substantially equal to a length of said magnets.

26. A parts alignment device comprising:

an input port introducing chip-like parts having magnetic substance electrodes at least on the front surface and the back surface at opposite ends thereof, said parts being formed into substantially rectangular parallelepiped shapes;

a storage chamber storing said parts introduced through said input port;

a wall made of non-magnetic material, said wall defining a back surface of said storage chamber;

an arc-like guide made of non-magnetic material and provided at least above said storage chamber;

an intake port provided in connection with said guide and taking in said parts;

a parts passageway connected to said intake port and extending downstream of said intake port;

a rotary plate made of non-magnetic material and provided at the rear of said wall so as to rotate in a parts taking-in direction of said intake port; and a magnet secured to said rotary plate and being disposed so that magnetic flux from said magnet intersects said rotary plate perpendicularly and passes behind said intake port, and an elastic member, said elastic member being inserted between said magnet and said rotary plate.

27. The parts alignment device according to claim 20, wherein said intake port is provided between a position at the highest point of said arc-like guide and a position rotated from the highest point by an angle of substantially 45 degrees in the direction of rotation of said rotary plate.

28. The parts alignment device according to claim 20, wherein a motor for rotating said rotary plate is a DC motor.

29. A parts alignment device comprising:

an input port introducing parts made of copper wires including a very small quantity of iron;

a storage chamber storing said parts introduced through said input port;

a wall made of non-magnetic material, said wall defining a back surface of said storage chamber;

an arc-like guide made of non-magnetic material;

an intake port provided in connection with said guide and taking in said parts, wherein said arc-like guide extends from a lower portion of said storage chamber to said intake port, and a groove for aligning said parts in one direction is provided between said guide and said wall;

a parts passageway connected to said intake port and extending downstream of said intake port;

a rotary plate made of non-magnetic material and provided at a rear of said wall, said rotary plate rotating in a part taking-in direction of said intake port; and a magnet provided on said rotary plate and passing behind said intake port.

30. The parts alignment device according to claim 29 wherein a length of said magnet is larger than a length of said parts.

31. The parts alignment device according to claim 29 wherein a width of said magnet in a direction perpendicular to the magnetic flux is smaller than a value five times a large as a width of said intake port.

32. The parts alignment device according to claim 29, wherein said magnet has a curvature substantially equal to a curvature of said arc-like guide.

33. The parts alignment device according to claim 29, wherein said intake port is provided between a position at a highest point of said arc-like guide of said storage chamber and a position rotated from the highest point by an angle of substantially 45 degrees in the direction of rotation of said rotary plate.

34. The parts alignment device according to claim 29, wherein a motor for rotating said rotary plate is a DC motor.

35. The parts alignment device according to claim 29, wherein said parts are made of brass including 2% to 3% iron.

* * * * *

UNITED STATES PATENT AND TRADEMARK OFFICE
CERTIFICATE OF CORRECTION

PATENT NO.    : 6,123,184
DATED         : September 26, 2000
INVENTOR(S)   : Mikio Yasuda et al.

It is certified that error appears in the above-identified patent and that said Letters Patent is hereby corrected as shown below:

Column 4,
Line 50, delete "the-parts" and insert -- the parts --.

Column 9,
Line 11, delete "there-is" and insert -- there is --.

Column 10,
Line 49, delete "rotation-direction" and insert -- rotation direction --.

Column 11,
Line 50, after "chamber" delete -- , --.

Claim 1,
Line 10, delete "sort" and insert -- port --.
Line 13, delete "Parts" and insert -- parts --.

Claim 8,
Line 5, delete "Port;" and insert -- port; --.

Claim 19,
Line 2, delete "in-put" and insert -- input --.

Signed and Sealed this

Thirteenth Day of November, 2001

*Attest:*

NICHOLAS P. GODICI
*Attesting Officer*    Acting Director of the United States Patent and Trademark Office